United States Patent [19]

Bose et al.

[11] Patent Number: 5,240,782
[45] Date of Patent: Aug. 31, 1993

[54] FIBER AND WHISKER REINFORCED COMPOSITES AND METHOD FOR MAKING THE SAME

[75] Inventors: Animesh Bose; James Lankford; Richard Page; Cheryl Blanchard, all of San Antonio, Tex.

[73] Assignee: Southwest Research Institute, San Antonio, Tex.

[21] Appl. No.: 867,765

[22] Filed: Apr. 13, 1992

Related U.S. Application Data

[62] Division of Ser. No. 726,981, Jul. 8, 1991.

[51] Int. Cl.$^5$ .............................................. B22F 7/00
[52] U.S. Cl. ................................... 428/549; 428/551
[58] Field of Search ............... 428/549, 551, 552, 457, 428/569, 614, 288, 105, 285, 539.5; 501/89, 92, 95; 264/86, 63, 60; 419/8

[56] References Cited

U.S. PATENT DOCUMENTS

| | | | |
|---|---|---|---|
| 3,653,851 | 4/1972 | Gruber | 428/539.5 |
| 3,778,334 | 12/1973 | Sturgeon et al. | 428/285 |
| 4,158,687 | 6/1979 | Yajima et al. | 264/60 |
| 4,463,058 | 7/1984 | Hood | 75/229 |
| 4,485,179 | 11/1984 | Brennan | 501/92 |
| 4,543,345 | 9/1985 | Wei | 501/95 |
| 4,657,877 | 4/1987 | Becher et al. | 501/89 |
| 4,888,247 | 12/1989 | Zweben et al. | 428/105 |
| 4,927,792 | 5/1990 | Petrovic et al. | 501/92 |
| 4,956,316 | 9/1990 | Sawyer | 264/63 |
| 5,069,841 | 12/1991 | Petrovic et al. | 264/86 |

*Primary Examiner*—Peter A. Nelson
*Assistant Examiner*—Anthony R. Chi
*Attorney, Agent, or Firm*—Baker & Botts

[57] ABSTRACT

A composite material (20) comprises a matrix layer (21) having a plurality of interspersed reinforcing whiskers (23) and a plurality of continuous reinforcing fibers (25) embedded within the matrix layer (21). The preferred embodiment includes a matrix layer (21) which may be a ceramic, intermetallic or metallic material having interspersed reinforcing whiskers (23) upon which a second layer of the matrix (24) having embedded continuous reinforcing fibers (25) is placed, and a third layer (22) of the matrix material having the interspersed reinforcing whiskers (23) on the second layer (24). The composite exhibits improved fracture toughness due to the crack deflection ability of whiskers (23) and crack bridging and fiber pull out due to continuous fibers (25) and minimizes creep associated with known ceramic and intermetallic composites.

11 Claims, 1 Drawing Sheet

FIBER AND WHISKER REINFORCED COMPOSITES AND METHOD FOR MAKING THE SAME

RELATED APPLICATIONS

This application is a division of application Ser. No. 07/726,981, filed Jul. 8, 1991 and entitled "FIBER AND WHISKER REINFORCED COMPOSITES AND METHOD FOR MAKING THE SAME".

TECHNICAL FIELD OF THE INVENTION

Generally, the present invention relates to composite materials and methods for making composite materials, and more particularly to a combined continuous fiber and whisker reinforced composite material having improved material properties.

BACKGROUND OF THE INVENTION

For a variety of applications, equipment and component designers are finding uses for ceramic, intermetallic, and metallic composites. One reason for this trend is that the ability of composite materials to withstand high temperature stresses as structural elements is greatly desired. However, the ceramic and intermetallic composites typically may fracture under the strain of use due to brittleness and tend to creep at high temperature. As a result, these materials are not entirely suitable for structural components in numerous applications.

Some known attempts to overcome the brittleness and creep problems use fibers or whiskers to reinforce the ceramic and intermetallic composites. For example, in one effort a $MoSi_2$ matrix was reinforced with 20 volume percent SiC whiskers to achieve a 54% increase in the fracture toughness and a 100% increase in the flexural strength of the material. In this effort, the fracture toughness of 8.2 MPa.m$^{\frac{1}{2}}$ was obtained. Although this represents a significant improvement in the material properties of the composite material, the fracture toughness still falls short of the acceptable regime for structural components in most applications. In many structural component applications, a consistent fracture toughness level of 12-15 MPa.m$^{\frac{1}{2}}$, is desirable. As a result, significant room for improvement exists in the fracture toughness of composite materials. Additionally, known applications of whisker impregnated composite materials still exhibit considerable creep at high temperatures under load.

Thus there is a need for a composite material that does not exhibit the brittleness of known ceramic, intermetallic, and metallic composites.

There is a need for a composite for use in structural components that possesses improved fracture toughness.

There is yet the need for a ceramic and intermetallic composite that advantageously uses whiskers for increased flexural strength, as well as further providing increased fracture toughness beyond known levels.

There is furthermore the need for an improved composite material that avoids the high temperature creep phenomenon of known composites.

SUMMARY OF THE INVENTION

The present invention, accordingly, overcomes the problems and limitations associated with known ceramic and intermetallic composites to provide a composite having improved strength, fracture toughness, and that may be used at high temperatures with minimal creep.

According to one aspect of the invention, there is provided a composite comprising a layer of ceramic or intermetallic matrix having a plurality of interspersed reinforcing whiskers in combination with a plurality of embedded continuous reinforcing fibers.

According to another aspect of the invention, there is provided a method for making a composite comprising a ceramic or intermetallic matrix. The method comprises the steps of mixing reinforcing whiskers and a ceramic or intermetallic powder with a binder material at a temperature of approximately 100° C. The mixture is then made into sheets which are heated so that the binder vaporizes to yield thin sheets of composite with interspersed reinforcing whiskers. Next, in the preferred embodiment, silicon carbide fibers are rolled from a cylinder or drum and laid on a predetermined number of the thin composite sheets to form the desired composition. In the preferred embodiment, the composite has a layer of molybdenum disilicide reinforced with silicon carbide whiskers followed by a molybdenum disilicide layer having continuous silicon carbide fibers. The resulting composite exhibits improved properties for very high temperature applications.

A technical advantage of the present invention is that the composite material strengthens the matrix at high temperatures as a result of the presence of the whiskers and fibers. This is because the fibers act as a load bearing member in high temperature applications.

Another technical advantage of the present invention is that at low and high temperatures the whiskers toughen the matrix by crack deflection and the continuous fibers further toughen the matrix by both crack bridging and fiber pull out within the composite.

Yet another technical advantage of the present invention is that in high temperature applications the composite minimizes the creep phenomena typical of known ceramic or intermetallic composites.

Still another technical advantage of the present invention is that the silicon carbide whiskers reduce substantially the silicon rich low-temperature grain boundary phase that forms during hot pressing of a pure $MoSi_2$ matrix.

BRIEF DESCRIPTION OF THE DRAWINGS

The invention and its modes of use and advantages are best understood by reference to the following description of illustrative embodiments read in conjunction with the accompanying drawings, wherein.

DETAILED DESCRIPTION OF THE INVENTION

The preferred embodiment of the present invention is best understood by referring to the FIGUREs, wherein like numerals are used for like and corresponding parts of the various components.

Figure 1:
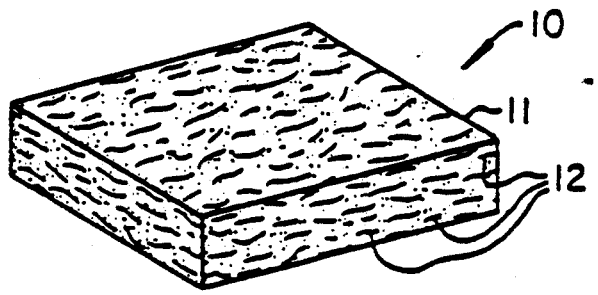
FIG. 1 is a perspective view of a composite typical of prior art having whiskers distributed therethrough.
Figure 2:
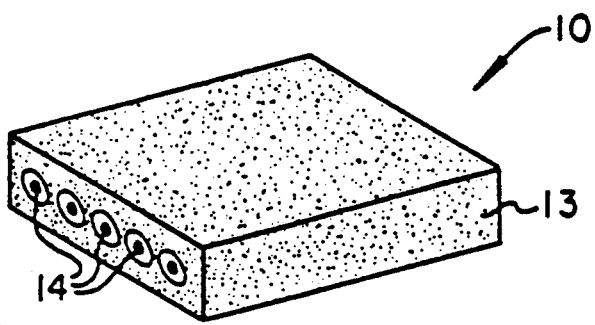
FIG. 2 is a perspective view of a typical continuous fiber composite of the prior art possessing fiber reinforcement.
Figure 3:
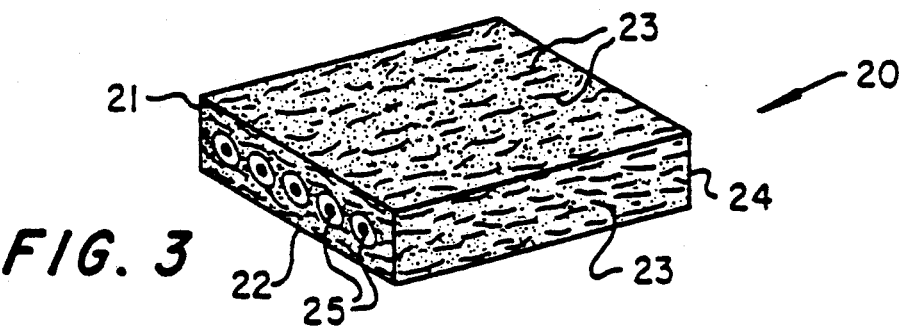
FIG. 3 provides a perspective view of the preferred embodiment.
Figure 4:
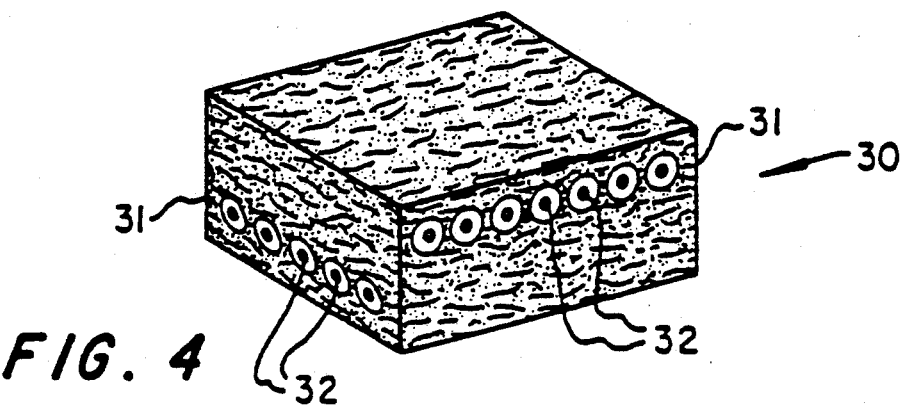
FIG. 4 shows a perspective view of an alternative embodiment of the present invention.

FIGS. 1 and 2 provide perspective views of prior art composites 10. The intermetallic or ceramic matrix 11 of FIG. 1 possesses whiskers 12 that distribute substantially uniformly within the ceramic reinforcing material. On the other hand, composite 10 of FIG. 2, shows matrix 13 which comprises continuous strands 14 of ceramic fiber. Both of these configurations, if used alone, do not satisfactorily exhibit sufficient fracture toughness for use as structural components, nor do they substantially reduce the undesirable creep phenomena of the matrix at high temperatures. In the case of molybdenum disilicide reinforced with approximately 20 volume percent of silicon carbide, a fracture toughness nearly 8.2 MPa.m$^{\frac{1}{2}}$ has been obtained. This level falls short of an acceptable requirement for structural components, particularly for those components used in the aerospace industry. For these types of applications, a fracture toughness level of 12–15 MPa.m$^{\frac{1}{2}}$ is necessary. FIGS. 3 and 4, on the other hand, illustrate a preferred and an alternative embodiment of the present invention which overcome the limitations inherent in known ceramic and intermetallic composites.

With reference to FIG. 3, there is shown a three-layer composite 20 in which upper layer 21 and lower layer 22 are reinforced with whiskers 23 and intermediate layer 24 is reinforced with fibers 25. FIG. 4 provides an alternative embodiment showing a different layer configuration from that of FIG. 3. The orientation of layers 31 of composite 30 having fibers 32 provides perpendicular layers of fiber mats that have additional strength in the direction perpendicular to the direction of fibers in FIG. 3. Obviously, instead of being perpendicular the angle of continuous fibers 32 may vary.

An important aspect of the preferred embodiment is the combination of composite layers with different forms of ceramic (e.g., silicon nitride, silicon oxide, aluminum oxide, or zirconium oxide), intermetallic (e.g., molybdenum disilicide, rhenium silicide, tungsten silicide, nickel aluminide, titanium aluminide, iron aluminide, or niobium aluminide), or metal (e.g., W, Mo, Ta and other similar metals) reinforcement. It is also possible to form ceramic layers in the present invention that utilize pre-ceramic polymers that become ceramic during processing. Moreover, mixtures of ceramic, intermetallic, pre-ceramic or metals may be used as the matrix layers for the present invention. The preferred embodiment, however, uses ceramic reinforcement for the composite.

Although the preferred embodiment uses at least one layer that ceramic whiskers reinforce and at least another layer that ceramic fibers reinforce, the combined ceramic whisker and ceramic fiber reinforcement may take place in one layer. It will be evident, however, that the number of layers of differentially reinforced elements of the composite may vary widely depending on the composite's desired end use.

The preferred embodiment uses a combination of whisker reinforcement and fiber reinforcement within the composite layer. As such, one layer is reinforced by whiskers and another layer is reinforced with fibers. Irrespective of the number of layers used, which may vary according to the particular use of the composite of the present invention, there are preferred materials for both the whiskers and the fibers. For the whiskers, ceramic materials such as silicon nitride or silicon carbide are preferable. However, any known and available materials such as silicon carbide, alumina, carbon, titanium diboride, tungsten, silicon-nitride, niobium, or other similar materials may also serve as reinforcing whiskers. Again, the particular material for the whiskers depends in large part by the ultimate use of the composite and the compatibility of the whiskers to the matrix. For the reinforcing fibers, a ceramic or other material similar to the material of the whiskers is appropriate. A major difference, however, is that the reinforcing fibers take a long continuous fiber form as opposed to the short discontinuous form of the reinforcing whiskers.

Depending on the desired properties of the final composite, the proportions of whiskers and fibers may vary. For example, the degree of whisker reinforcement in any layer may vary from one percent to fifty percent by volume of the matrix. Concerning the fibers which are continuous throughout the matrix, they may vary from one percent to twenty percent by volume in the composite.

The composites of the preferred embodiment provide a strengthened matrix in which the continuous fibers act as load bearing members and the reinforcing whiskers reduce the propensity of the composite to exhibit creep. Additionally, at low temperatures, the reinforcing whiskers maximize crack deflection while the continuous fibers enhance crack bridging and fiber pull-out. Whiskers in the preferred embodiment also reduce substantially the silicon-rich low-temperature grain boundary phase that forms during high temperature processing of certain intermetallics such as molybdenum disilicide.

Having described the composition of the preferred embodiment, it is now appropriate to describe its preferred manufacturing process. The preferred process of manufacturing the composites requires formation of individual reinforced layers by powder injection molding or tape casting followed by combining the layers to form a composite. To explain the manufacturing process of the preferred embodiment, consider a composition of molybdenum disilicide powder as the matrix material and silicon carbide as the reinforcing material for both the whiskers and the continuous fibers.

Formation of the whisker reinforced layer occurs by mixing the molybdenum disilicide powder with the silicon carbide whiskers and a binder which may be a polymer, a combination of polymers, or a combination of polymers with a wax or oil. The polymer or combination of polymers in wax or oil should be solid at room temperature and molten at low temperatures of approximately 100° C. Suitable polymers for this step of the process are polystyrene and polypropylene, while suitable wax may be carnauba wax.

At this stage, also, pre-ceramic polymers that are fluid during the sheet forming stage and that can be converted to ceramic during a subsequent debinding stage may also be used. In any event, approximately equal volumes of binder and mixture of reinforcing whiskers and matrix material are used at this stage. Mixing of binder and the whisker-matrix mixture is performed at elevated temperatures and preferably in a vacuum atmosphere. The resultant mixture or "feed stock" is then formed into sheets of desired thickness by any conventional means such as injection molding, extrusion, tape casting or compression molding and, if desired, the whiskers may be aligned during the molding in the direction of flow.

The sheets of the feed stock are then heated to a temperature above the melting point of the binder. Typically, this can be accomplished by heating the feed stock to about 800° C. This causes the binder to disintegrate and remove the volatile products with flowing gases over the sheets.

Sheets of silicon-carbide fiber-reinforced matrix are formed by continuous strands of the silicon carbide fibers, held together by a polymeric glue and held on a drum to form a sheet. The polymer-bound sheets of fibers are used as one of the layers used to form the composite. The composite is formed by placing alternate layers of the fiber and whisker-reinforced materials on top of each other to form the desired height and shape of the composite. The shape is then hot pressed at a temperature sufficient to sinter the layers, usually about 1500°–1800° C. to form the actual composite. The number of layers and orientation of the layers may vary, of course, depending on the desired properties of the final composite.

In summary, the above description details a new composite possessing improved material properties at both high and low temperatures. The composite uses both reinforcing whiskers and continuous fibers in a unique architecture to improve load bearing characteristics over known composites. Moreover, described methods for manufacturing the composite make the composite easily adaptable to a wide variety of industrial applications.

Although the preferred embodiment has been described in detail, it should be understood that various changes, substitutions and alterations may be made herein without departing from the spirit and scope of the invention as defined in the appended claims.

What is claimed is:

1. A method of forming a composite material possessing a matrix layer having a plurality of interspersed reinforcing whiskers and a plurality of continuous reinforcing fibers, comprising the steps of:

forming a mixture of matrix layer material, the whiskers, and a binding material;
   forming sheets of said mixture;
   heating said sheets to burn out said binder;
   associating a plurality of continuous fibers in a predetermined number of said plurality of sheets;
   forming a single multi-layered form having alternating layers of said sheets wherein a first of said alternating layers has no associated continuous fibers followed by a sheet having associated continuous fibers; and
   sintering said single multi-layered form to produce a single composite material possessing both interspersed whiskers and continuous reinforcing fibers therewithin.

2. The method of claim 1, wherein said multi-layer forming step further comprises the step of stacking said sheets containing continuous fibers to produce alternating layers such that a predetermined number of said continuous fibers are perpendicular to one another.

3. The method of claim 1, wherein said sheet forming step comprises injection molding said mixture.

4. The method of claim 1, wherein said sheet forming step comprises extruding said mixture.

5. The method of claim 1, wherein said sheet forming step comprises tape casting said mixture.

6. The method of claim 1, wherein said sheet forming step comprises the step of compressing said mixture.

7. The method of claim 1, wherein said fiber associating step comprises the step of embedding said continuous fibers in a predetermined number of said sheets.

8. The method of claim 1, wherein said continuous fiber associating step comprises the step of associating a polymer-bound sheet of said continuous fibers with said predetermined number of sheets.

9. The method of claim 1, wherein said sintering step comprises the step of heating said multiple layer form to a temperature of between 1500° and 1800° C.

10. The method of claim 1, wherein said multi-layer forming step comprises the step of laying first a sheet comprising said matrix layer having interspersed reinforcing whiskers, then laying on said first layer a second layer comprising said continuous reinforcing fibers, and then laying on said second layer opposite said first layer a third sheet of said matrix layer comprising said interspersed reinforcing whiskers.

11. The method of claim 10, wherein said multi-layer forming step further comprises the steps of laying on said third sheet a fourth layer comprising said reinforcing whiskers;

laying on said fourth layer a fifth layer comprising continuous reinforcing fibers, said reinforcing fibers oriented perpendicular to said reinforcing fibers in said second layer; and
   laying on said fifth layer a sixth layer comprising said interspersed reinforcing whiskers.

* * * * *